United States Patent [19]
Rieck et al.

[11] Patent Number: 5,087,022
[45] Date of Patent: Feb. 11, 1992

[54] MEANS CONNECTING A COMMERCIAL VEHICLE AXLE WITH THE CHASSIS

[75] Inventors: Gerhard Rieck; Ingo Scholly; Armin Mertens, all of München, Fed. Rep. of Germany

[73] Assignee: MAN Nutzfahrzeuge GmbH, München, Fed. Rep. of Germany

[21] Appl. No.: 332,296

[22] Filed: Mar. 31, 1989

[30] Foreign Application Priority Data

Apr. 7, 1988 [DE] Fed. Rep. of Germany ....... 3811630

[51] Int. Cl.⁵ .................... B60G 13/08; B60G 15/04
[52] U.S. Cl. ................................ 267/219; 267/221
[58] Field of Search ................. 267/219–221, 267/225, 227, 31, 35, 217, 33; 280/662, 697, 668

[56] References Cited

U.S. PATENT DOCUMENTS

| | | | |
|---|---|---|---|
| 2,212,259 | 8/1940 | Binder | 267/220 X |
| 2,925,263 | 2/1960 | Blythe | 267/219 |
| 3,001,610 | 9/1961 | Takagi | 267/217 X |
| 3,010,714 | 11/1961 | Stresnak et al. | 267/221 |
| 3,368,824 | 2/1968 | Julien | 267/34 X |
| 3,412,990 | 11/1968 | Gladstone | 267/220 |
| 3,768,828 | 10/1973 | Klein | 267/221 X |
| 3,936,039 | 2/1976 | McKinnon | 267/34 |
| 3,954,255 | 5/1976 | Keijzer et al. | 267/220 X |
| 3,993,295 | 11/1976 | Suzuki et al. | 267/219 X |
| 4,235,426 | 11/1980 | Sullivan, Jr. et al. | 267/220 |
| 4,886,256 | 12/1989 | Nishiyama et al. | 267/221 |

FOREIGN PATENT DOCUMENTS

| | | | |
|---|---|---|---|
| 413327 | 5/1925 | Fed. Rep. of Germany | 267/219 |
| 0275811 | 11/1987 | Japan | 267/220 |

Primary Examiner—Robert J. Oberleitner
Attorney, Agent, or Firm—Ladas & Parry

[57] ABSTRACT

An elastic coupling system to increase the permissible axle loading of a commercial vehicle without increasing the space needed for the main spring and without changing the road holding properties when the vehicle is traveling empty. A spring and a shock absorber are arranged in a common housing coaxially. This spring and shock absorber unit may be in combination with further springs or shock absorbers for connecting the axle with the chassis of the vehicle.

6 Claims, 6 Drawing Sheets

MEANS CONNECTING A COMMERCIAL VEHICLE AXLE WITH THE CHASSIS

BACKGROUND OF THE INVENTION

The invention relates to an axle connection unit comprising at least one spring and at least one shock absorber forming a link between one axle of a commercial vehicle and the chassis.

SUMMARY OF THE INVENTION

One object of the invention is to make it possible for the axle load in a commercial vehicle to be increased without changing the overall fitted size of the main spring and without impairing road holding characteristics when the vehicle is traveling empty or with a basic spring action under different loads in accordance with whether it is a question of a road or cross country vehicle.

In order to achieve these or other objects appearing herein, the unit comprises a spring and a shock absorber arranged in a common housing and aligned with a common longitudinal axis to form a spring and shock absorber unit which is provided alone or in combination with other springs or shock absorbers for connecting the axle with the chassis. This design makes it possible to do without highly involved modifications and new designs, which would have to provide the necessary space with permissible spring extension distances for further helical springs. There is thus the substantial advantage of being able to provide for the desired increases in axle load while at the same time maintaining good empty running characteristics using the spring and shock absorber unit of the invention without having to change the space needed for springs etc. The advantage of having the spring integrated in the shock absorber furthermore means that the spring is not able to kink even with the large spring extension and the extreme angular displacement of the axle.

As regards the combination of the spring and shock absorber unit with further absorbers or springs there are a number of various design possibilities. It is for instance possible to avoid having any further moments acting on the axle guide means by having a further respective spring on each side of the spring and shock absorber unit. If no further spring is to be used, it is possible, given a suitable size, for the axle load to be taken up only by the spring and shock absorber unit.

Further features and advantages of the invention will be seen from the the following description.

Different designs and applications in accordance with the invention will now be described, each of the drawing figures showing at least one spring and shock absorber unit placed between the chassis and axle bridge or leaf spring.

DETAILED DESCRIPTION OF WORKING EXAMPLES OF THE INVENTION.

Figure 1:
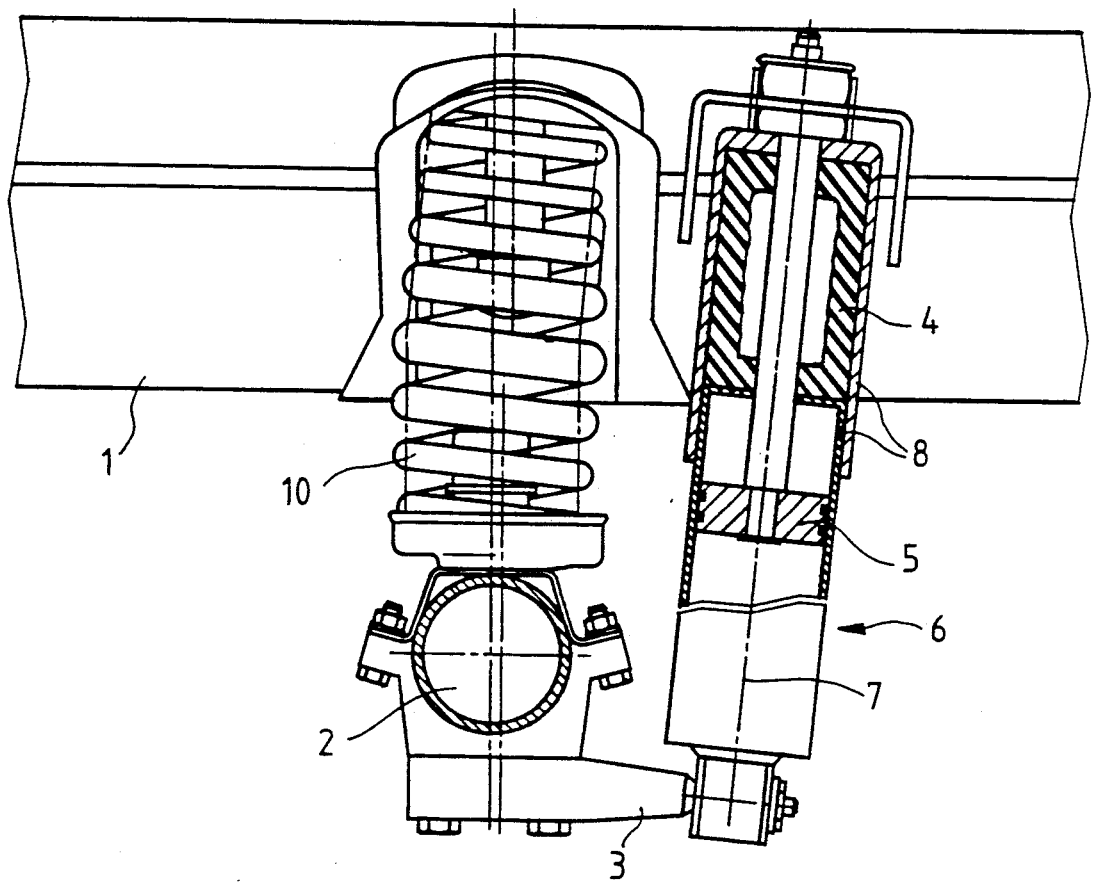
FIG. 1 shows a spring and shock absorber unit in combination with a helical spring.

In FIG. 1 it will be seen that a helical spring 10 and a spring shock absorber unit 6 are placed between the vehicle chassis 1 and the axle bridge 3 for connection with the axle 2. The spring and shock absorber unit 6 comprises a two-part housing 8, in which a spring 4 and a shock absorber 5 are placed sequentially along a common longitudinal axis 7. The spring 4 is in the form of a hollow cylinder of cellular polyurethane. The shock absorber 5 comprises a piston slidable in the lower part of housing 8 and a piston rod extending through the hollow cylinder and fixed to the upper part of the housing. The upper part of housing 8 slidably receives the lower part of the housing and the cylinder of cellular polyurethane is fitted snugly between the two parts of the housing 8. At its ends the polyurethane cylinder has bearing portions in which the rod of piston 5 is closely fitted and between the bearing portions the polyurethane cylinder has substantial clearance with the rod of piston 5.

Figure 2:
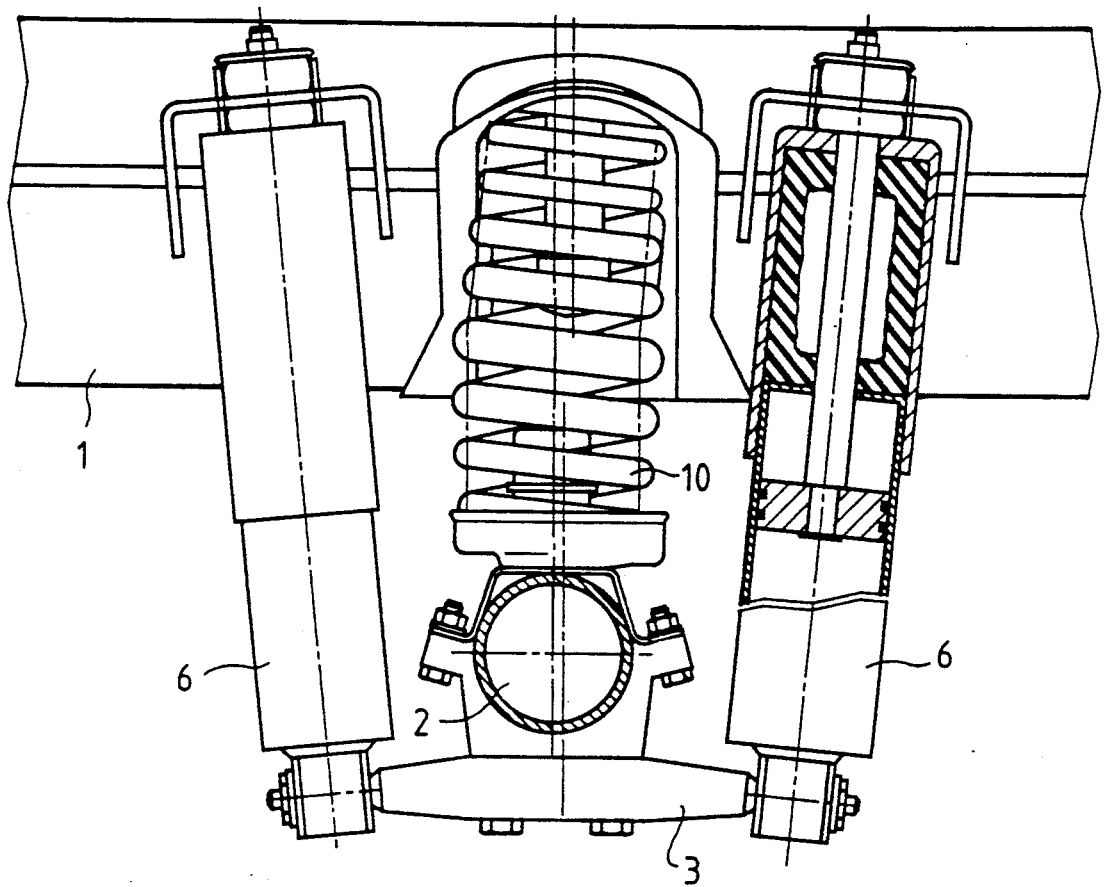
FIG. 2 shows two spring and shock absorber units in combination with a helical spring.

FIG. 2 shows a helical spring 10 arranged centrally in relation to the axle bridge and respective spring and shock absorber units 6 placed on either side of the helical spring.

Figure 3:
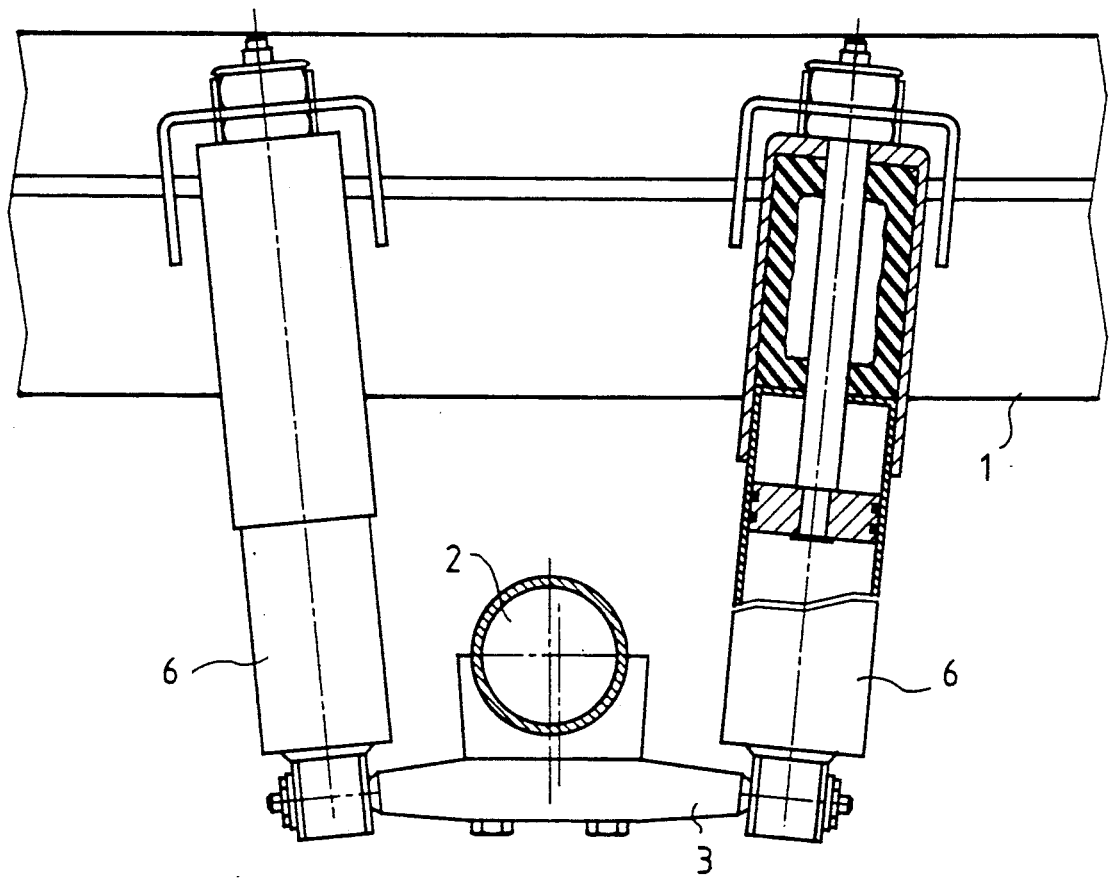
FIG. 3 shows two spring and shock absorber units.

FIG. 3 shows the arrangement of two spring and shock absorber units, mounted between the chassis 1 and the axle bridge 3 so that they are at the same distance from the axle 2.

Figure 4:
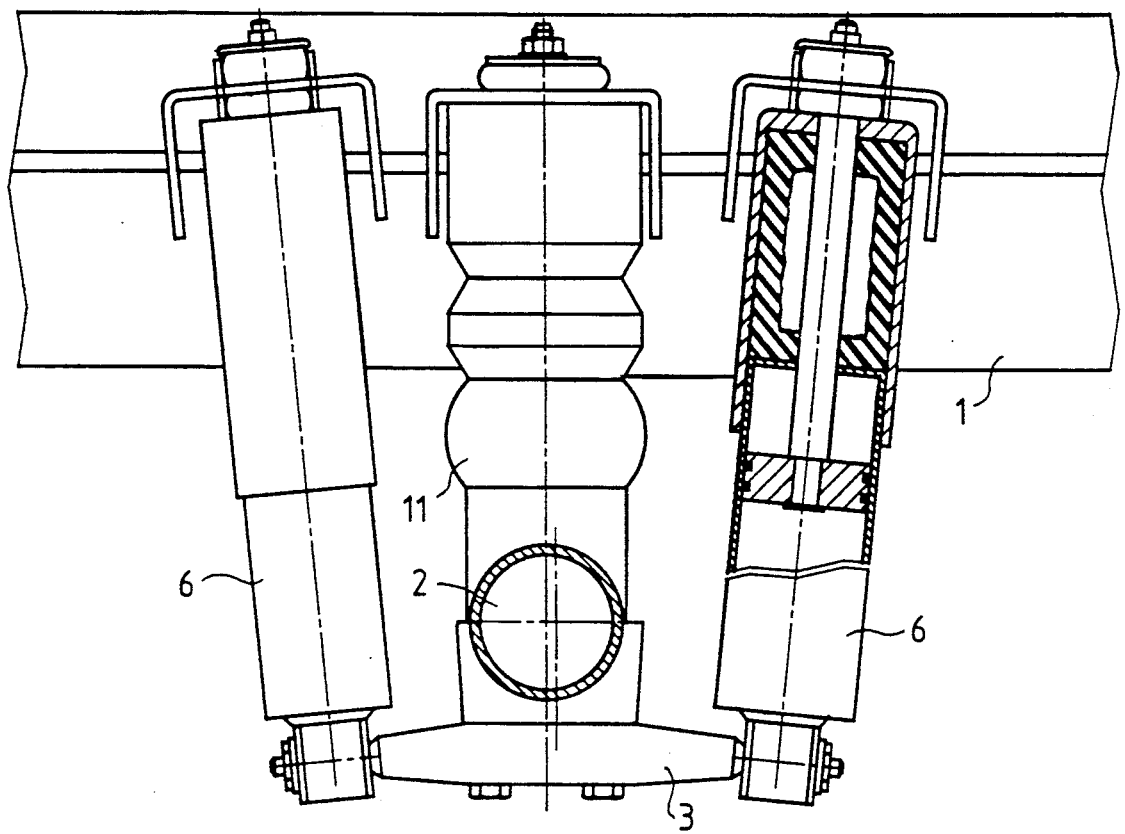
FIG. 4 shows two spring and shock absorber units in combination with a hollow rubber spring.

In the arrangement of FIG. 4 a tubular hollow spring 11 is installed between the vehicle chassis 1 and the axle bridge so as to be central in relation to the axle 2. The spring 11 is provided with a respective spring shock absorber unit 6 on either side at the same distance from the middle of the axle.

Figure 5:
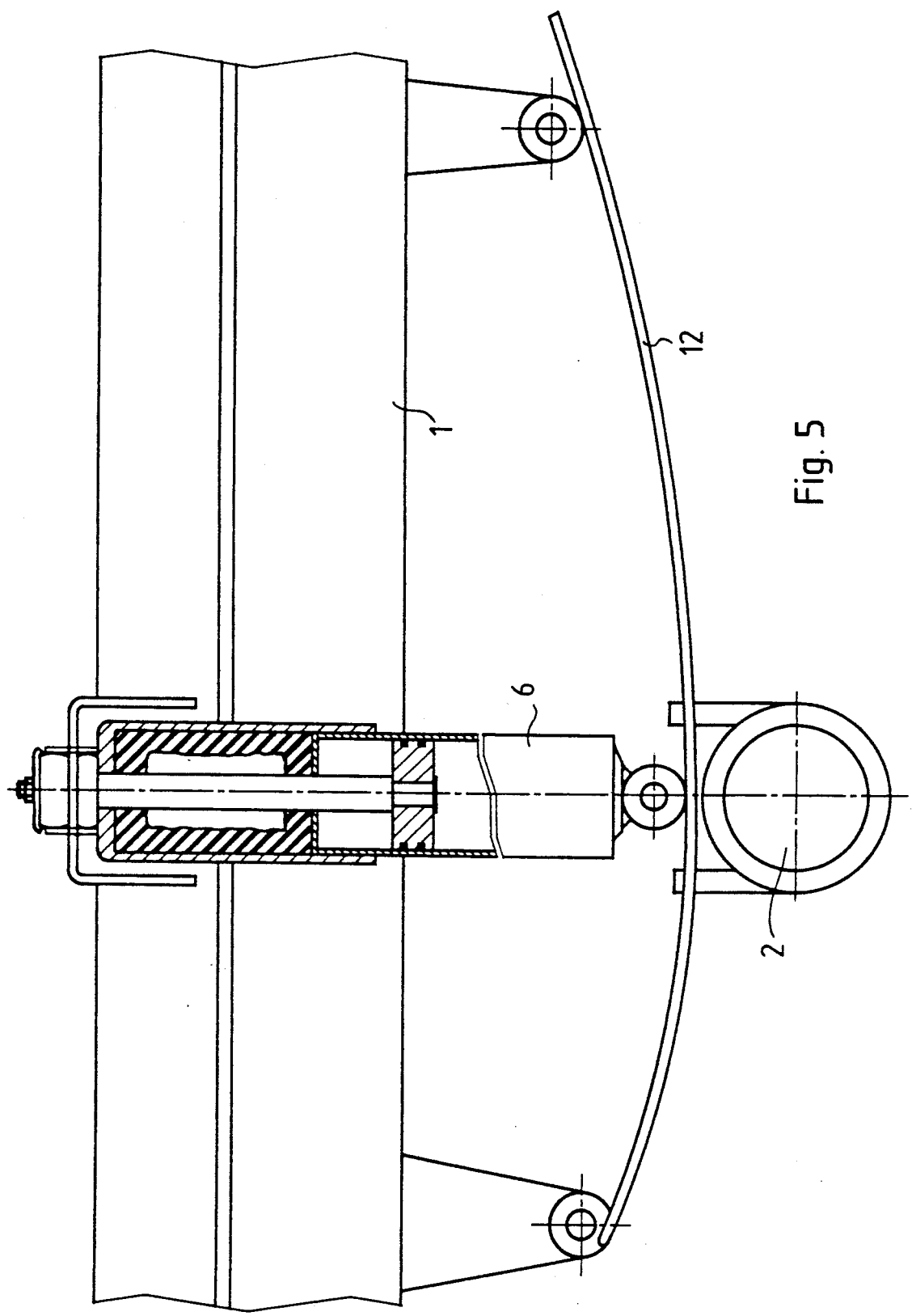
FIG. 5 shows a spring and shock absorber unit drivingly connected with a leaf spring connecting the axle with the chassis.

FIG. 5 shows the arrangement of a single spring and shock absorber unit 6 between the vehicle chassis 1 and a suspension leaf spring 12 for the suspension of the axle.

Figure 6:
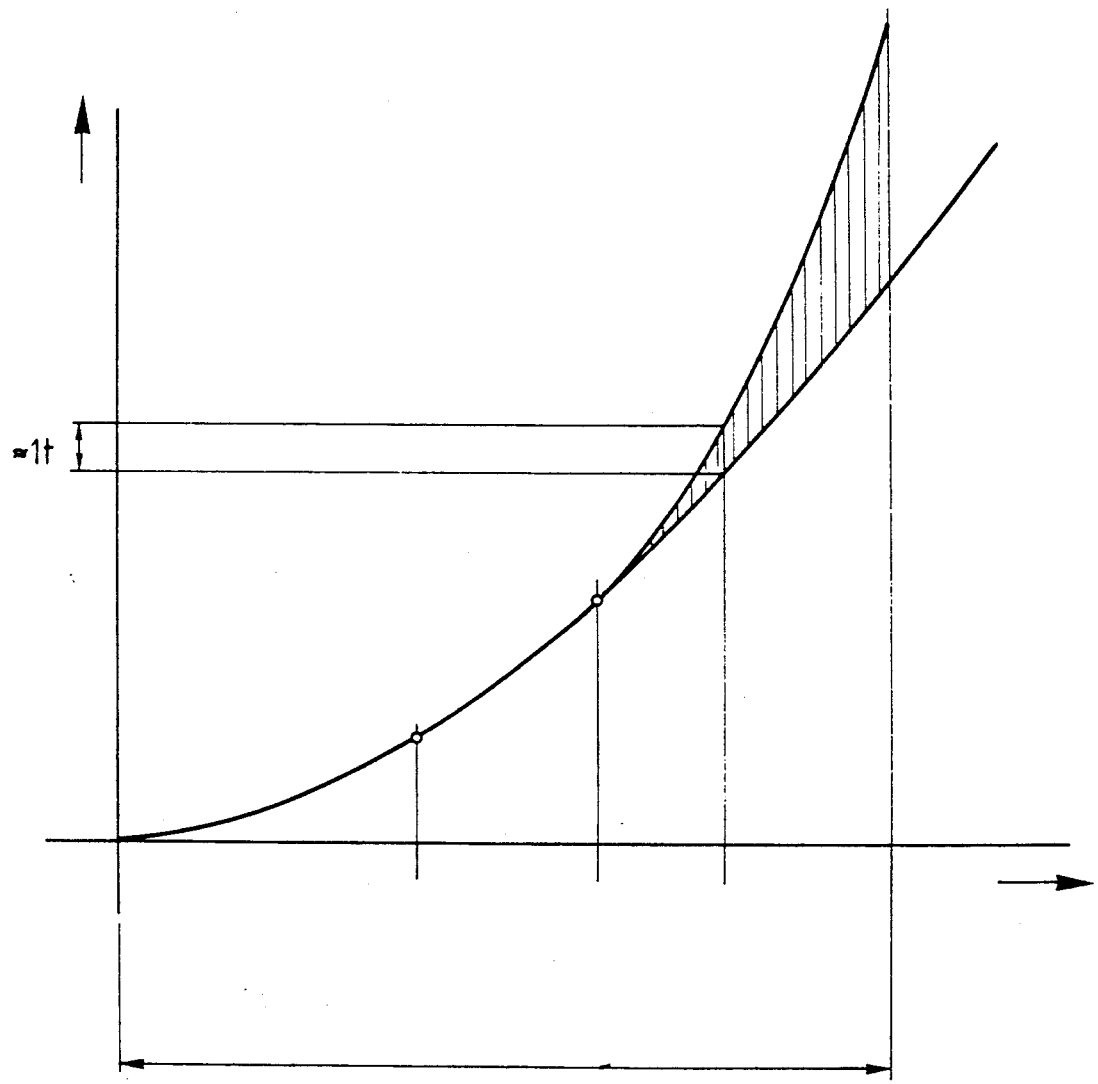
FIG. 6 shows the characteristic curve of a spring and, shock absorber unit.

FIG. 6 shows the spring characteristic curve of the system in accordance with the invention in which the point at which the additional spring 4, which is integrated in the spring and shock absorber unit 6, starts to take effect to indicate, the arrangement being such that it is capable of assuming higher axle loads under full load conditions while on the other hand the spring characteristic remains unaltered in the lower range, for example when traveling empty. In addition to the arrangements shown in the working examples other associations of the spring and spring shock absorber units would be possible.

What is claimed is:

1. Elastic coupling means between an axle and a chassis of a motor vehicle, comprising spring means connected between the axle and the chassis of the motor vehicle, and a combination spring and shock absorber unit extending between the axle and the chassis to act in combination with the spring means to resist relative displacement of the axle and the chassis towards one another, said spring and shock absorber unit including a spring member and a shock absorber in axial alignment, said combination spring and shock absorber unit comprising a two part housing, one part of said two part housing comprising a first cylindrical part and the other part of said two part housing comprising a second cylindrical part having an open end in which said first cylindrical part is slidably fitted coaxially of said second cylindrical part, said spring member comprising a hollow cylinder of cellular polyurethane fitted between the two parts of the housing to resist displacement therebetween, said shock absorber comprising a piston slidable in said first cylindrical part of the housing and secured to the second cylindrical part of the housing, said piston including a rod extending through the hollow cylinder, said hollow cylinder of cellular polyurethane being fitted in said second cylindrical part of the housing and having an outer cylindrical surface in contact with said second cylindrical part of the housing, said hollow cylinder of cellular polyurethane further having a first end bearing against an end of said second cylindrical part of the housing and a second opposite end bearing against an end of said first cylindrical part of the housing, said outer cylindrical surface of said cylinder of cellular polyurethane being in contact over its entire axial length with said second cylindrical part of the housing to be effective during the entire translation of the piston in said first cylindrical part of the housing in resisting relative displacement between the axle and the chassis after a specific spring load is resisted by said spring means.

2. Elastic coupling means as claimed in claim 1 wherein said spring means comprises a helical spring, said elastic coupling means further comprising an axle bridge extending laterally from said axle, said combination spring and shock absorber unit being connected to said axle bridge and said chassis and extending substantially parallel to said helical spring.

3. Elastic coupling means as claimed in claim 2 comprising a second spring and shock absorber unit connected to said axle bridge and said chassis parallel to said helical spring, said helical spring being disposed between said units.

4. Elastic coupling means as claimed in claim 1 wherein said spring means comprises a hollow elastic cylinder, said elastic coupling means further comprising an axle bridge extending laterally from said axle, said combination spring and shock absorber unit being connected to said axle bridge and said chassis parallel to said elastic cylinder, and a second spring and shock absorber unit connected to said axle bridge and said chassis parallel to said hollow elastic cylinder, said cylinder being disposed between said units.

5. Elastic coupling means as claimed in claim 1 wherein said first cylindrical part has an outer diameter substantially equal to the inner diameter of the second cylindrical part and slidably fitted therein.

6. Elastic coupling means as claimed in claim 5 wherein said first and second ends of said hollow cylinder of cellular polyurethane each respectively includes a solid cylindrical portion having a central opening of a diameter corresponding to that of said piston rod, said hollow cylinder of cellular polyurethane having an inner diameter between said first and second ends which is larger than the outer diameter of the central openings in the solid cylindrical portions of said ends.

* * * * *